(12) United States Patent
Chen (10) Patent No.: US 7,636,996 B2
(45) Date of Patent: Dec. 29, 2009

(54) SEAL INSTALLATION TOOL

(75) Inventor: Hui Chen, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 12/047,597

(22) Filed: Mar. 13, 2008

(65) Prior Publication Data

US 2009/0229100 A1 Sep. 17, 2009

(51) Int. Cl.
 *B23P 19/04* (2006.01)
(52) U.S. Cl. .............................. 29/263; 29/270; 29/278
(58) Field of Classification Search ................... 29/263, 29/255, 278, 256, 259, 260, 271
 See application file for complete search history.

(56) References Cited

U.S. PATENT DOCUMENTS

| | | | | | |
|---|---|---|---|---|---|
| 1,394,129 | A | * | 10/1921 | Wickersham | ................. 29/261 |
| 1,708,355 | A | * | 4/1929 | Chipman | ..................... 29/261 |
| D268,253 | S | * | 3/1983 | Kennedy | ...................... D10/64 |
| 4,868,965 | A | * | 9/1989 | Drymon | ...................... 29/259 |
| 5,727,298 | A | * | 3/1998 | Strong | ........................... 29/259 |
| 6,012,211 | A | * | 1/2000 | Ochoa et al. | ................. 29/426.5 |
| D452,121 | S | * | 12/2001 | Teichelman | .................... D8/19 |
| 6,415,491 | B1 | * | 7/2002 | Klann | ........................... 29/259 |
| 6,594,914 | B1 | * | 7/2003 | Babcock | ....................... 33/535 |
| 6,886,228 | B1 | * | 5/2005 | Chen | ............................ 29/263 |
| 7,328,501 | B2 | * | 2/2008 | Smiley et al. | .................. 29/721 |
| 2008/0276438 | A1 | * | 11/2008 | King | ............................ 29/255 |

* cited by examiner

*Primary Examiner*—Lee D Wilson
(74) *Attorney, Agent, or Firm*—Patterson & Sheridan, LLP (57) ABSTRACT

A tool is provided to facilitate the assembly of a seal ring. The tool comprises an elongated body and a flange projecting radially from the elongated body. A first portion of the tool is configured to receive the placement of a seal ring and a retainer cap thereon. The retainer cap may carry attachment elements, such as screws, used to secure the retainer cap on the housing. To mount the seal ring, the tool is inserted through a shaft hole of the housing to clamp the seal ring and the retainer cap between the housing and a flange of the tool. The attachment elements then are tightened to fix the retainer cap on the housing, which secures the seal ring sandwiched between the retainer cap and the housing. After the assembly of the seal ring is completed, the tool may then be slidably removed.

18 Claims, 8 Drawing Sheets

SEAL INSTALLATION TOOL

BACKGROUND OF THE INVENTION

1. Field of the Invention

Embodiments of the present invention generally relate to a tool for installing a seal ring for a chemical mechanical polishing (CMP) apparatus.

2. Description of the Related Art

When performing CMP processes, the rotational speed of the polishing pad and the substrate affect the polishing rate as does the down force pressure with which the substrate is pressed against the polishing pad. The polishing slurry or electrolyte, in the case of electrochemical mechanical polishing (ECMP), also affects the polishing rate.

To perform a CMP process, the polishing pad and the substrate are rotated while pressed together. The polishing slurry (or electrolyte) is provided to the polishing pad. The material removal rate or polishing rate can be optimized such that a predetermined polishing rate can be achieved consistently by preselecting the rotational rate of the polishing pad, the rotational rate of the substrate, the down force pressure, and the amount of polishing slurry (or electrolyte) provided to the polishing pad. If any one of the rotational rate, down force pressure, or amount of polishing slurry deviates from the preselected values, the predetermined polishing rate may not be achieved and numerous substrates may be wasted.

Computers can be programmed to control the rotational rate of the polishing pad and the substrate as well as the down force pressure. Computers can also control opening and closing a valve for a predetermined period of time to permit polishing slurry to be delivered to the polishing pad. The amount of time that the valve is opened determines the amount of polishing slurry delivered. However, if there is a leak in the line delivering the polishing slurry to the polishing pad, an insufficient amount of polishing fluid may be delivered to the polishing pad and thus, the polishing rate may not meet the predetermined value.

Therefore, there is a need in the art for preventing leaks in polishing slurry delivery lines in a CMP apparatus.

SUMMARY OF THE INVENTION

The present invention generally relates to a tool for installing a seal ring for a CMP apparatus. In one embodiment, a seal installation tool for disposing a seal ring on a housing comprises an elongated body having a first portion and a second portion, the first portion having a first length and a first diameter, the second portion having a second length and a second diameter different from the first diameter and a flange projecting radially from the elongated body and separating the first portion from the second portion, the flange substantially encircling the elongated body and having one or more notches therein.

In another embodiment, a seal installation tool comprises an elongated body comprising a polymer, the body having a handle portion sized and shaped to be gripped by a technician, a fastening mechanism housing coupled to the handle portion and extending radially outward from the handle portion, and a seal receiving portion having a diameter less than a diameter of the handle portion, the seal receiving portion having a first surface substantially parallel to a surface of the handle portion, a second surface perpendicular to a surface of the handle portion, and a third surface disposed at an angle relative to both the first and second surfaces.

In another embodiment, a seal installation method comprises disposing a retainer cap onto a first portion of a tool, the tool comprising an elongated body having the first portion and a second portion, the first portion having a first length and a first diameter, the second portion having a second length and a second diameter different from the first diameter, and a flange projecting radially from the elongated body and separating the first portion from the second portion, the flange substantially encircling the elongated body and having one or more notches therein, disposing the seal on the tool in front of the retainer cap by sliding the seal ring over the portion of the elongated body, passing the first portion of the elongated body through a hole of a housing to clamp the seal between the retainer cap and the housing, and engaging one or more screws through the retainer cap to the housing to securely fix the seal ring and the retainer cap on the housing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The application describes a tool that facilitates the assembly of a seal ring on a housing for a CMP apparatus. One exemplary apparatus upon which the tool may be used to install the seal is a REFLEXION™ LK CMP apparatus and a REFLEXION LK ECMP™ apparatus available from Applied Materials, Inc., Santa Clara, Calif. It is to be understood that the invention may be used to install seals on other apparatus, including apparatus provided by other manufacturers.

Figure 1:
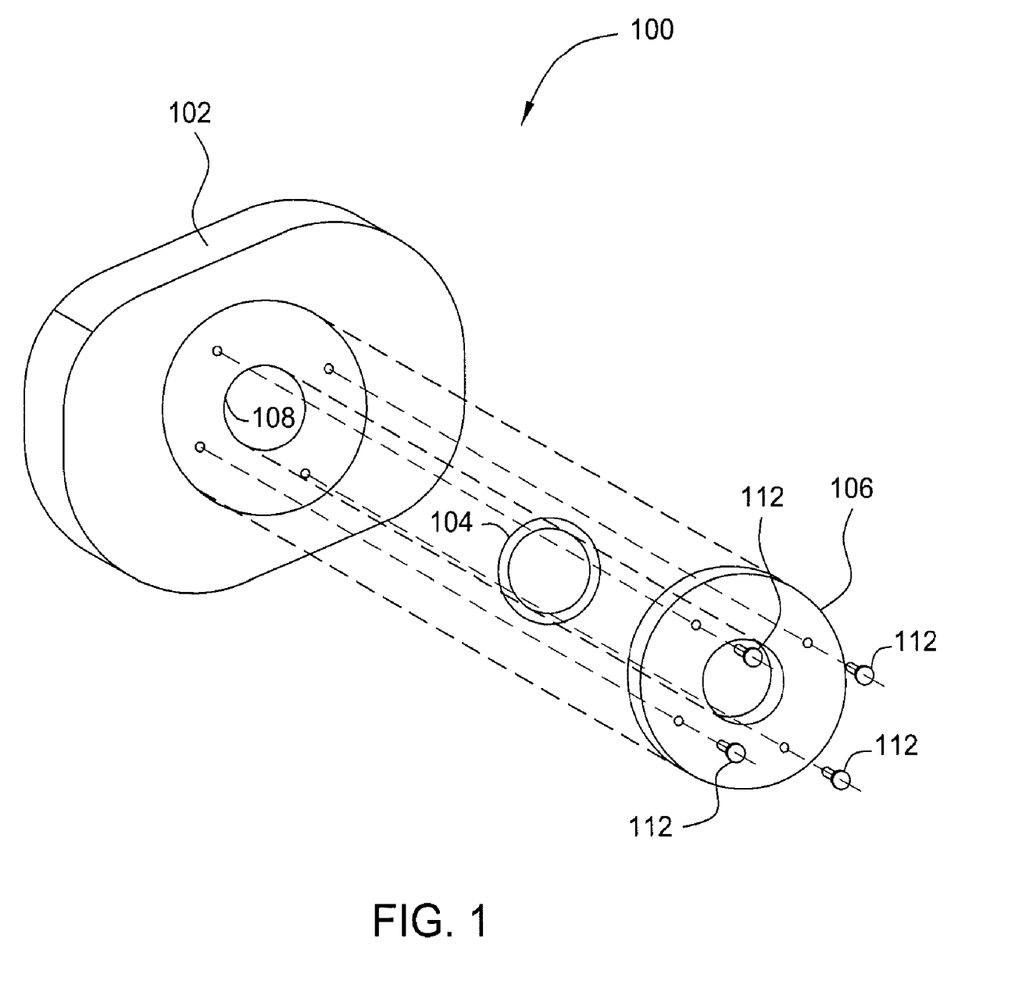
FIG. 1 illustrates a seal ring assembly.

FIG. 1 illustrates a seal ring assembly 100 adapted for use with a CMP apparatus. The seal ring assembly 100 comprises a housing 102, a seal ring 104 and a retainer cap 106. In one embodiment, the seal ring 104 may be an omni seal element. The housing 102 comprises a shaft hole 108 adapted for receiving a rotating shaft (not shown). To assemble the seal ring 104 on the housing 102, the seal ring 104 is first positioned coaxially at the rim of the shaft hole 108. The retainer cap 106 is then attached onto the housing 102 over the seal ring 104 by one or more fastening mechanisms 112. In one embodiment, the fastening mechanism 112 may comprise a screw. The seal ring 104 is thereby securely fixed on the housing 102 by the retainer cap 106.

One factor determining the integrity of the seal ring assembly 100 is whether the seal ring 104 is properly assembled on the housing 102. Indeed, if the seal ring 104 is not properly mounted, the seal ring 104 will break when the retainer cap 106 is secured to the housing 102. As many seal ring assemblies 100 are incorporated to accommodate multiple rotary shafts in the CMP apparatus, and the cost of each seal ring 104 is relatively expensive, replacement induced by improper assembly of the seal ring 104 may be onerous and expensive in cost.

To overcome the aforementioned issues, a tool is provided to facilitate the assembly of the seal ring to the housing. The tool is configured to receive the placement of the seal ring and the retainer cap thereon. The retainer cap may carry attachment elements, such as screws, used to secure the retainer cap on the housing. To mount the seal ring, the tool is inserted through a shaft hole of the housing to bring the seal ring and the retainer cap to a clamped position between the housing and a flange of the tool. While the tool is in the clamped position, the attachment elements are tightened to fix the retainer cap on the housing, which secures the seal ring sandwiched between the retainer cap and the housing. After the seal ring and the retainer cap are secured on the housing, the tool may then be slidably removed.

Figure 2A:
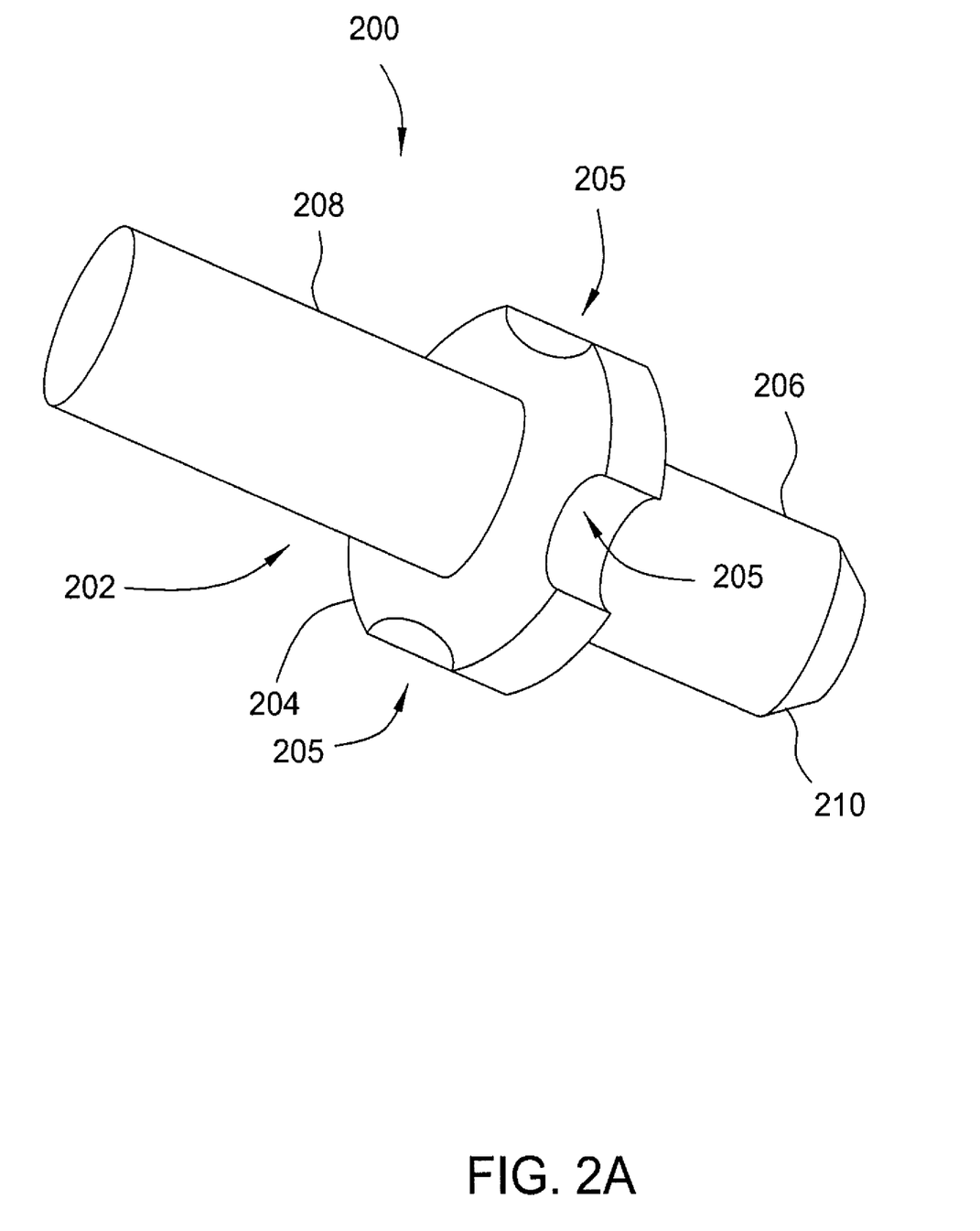
FIG. 2A is a perspective view showing an embodiment of a tool adapted for assembling a seal ring with a housing.

FIG. 2A is a perspective view showing one embodiment of a tool 200 configured to facilitate the assembly of a seal ring and a retainer cap on a housing. As shown, the tool 200 has an elongated body 202 that may be formed in a generally cylindrical shape. The elongated body 202 has an abuttal flange 204 that projects radially from and encircles the elongated body 202. A peripheral edge of the abuttal flange 204 comprises one or more notches 205. The abuttal flange 204 divides the elongated body 202 into a front portion 206 and a rear portion 208 opposite the front portion 206. The front portion 206 is adapted to receive the placement of the retainer cap and the seal ring by inserting coaxially through their respective openings. In one embodiment, the diameter of the front portion 206 may be between about 0.25 inches and about 0.75 inches for receiving the placement of a seal ring of a corresponding size. In addition, the front portion 206 may have a tapered edge 210 to facilitate the insertion of the front portion 206 through the retainer cap, the seal ring, and the shaft hole. The angle of the tapered edge 210 may be between about 10 degrees and about 45 degrees. The rear portion 208 is provided for the operator to grip the tool 200. The diameter and length of the rear portion 208 may be equal to or different from those of the front portion 206. The length and diameter of the rear portion 208 can be, for example, greater than those of the front portion 206 so as to facilitate its gripping by the operator.

In one embodiment, the length of the elongated body 202, including the front and rear portions 206 and 208 and the flange 204, may be between about 3 cms and about 20 cms. Moreover, the tool 200 may be formed in a single body made of a material that is rigid and lightweight so as to be easily handled by a human operator. Examples of suitable materials may comprise, without limitation, polyethylene terephthalate (PET) and like polymer materials.

Figure 2B:
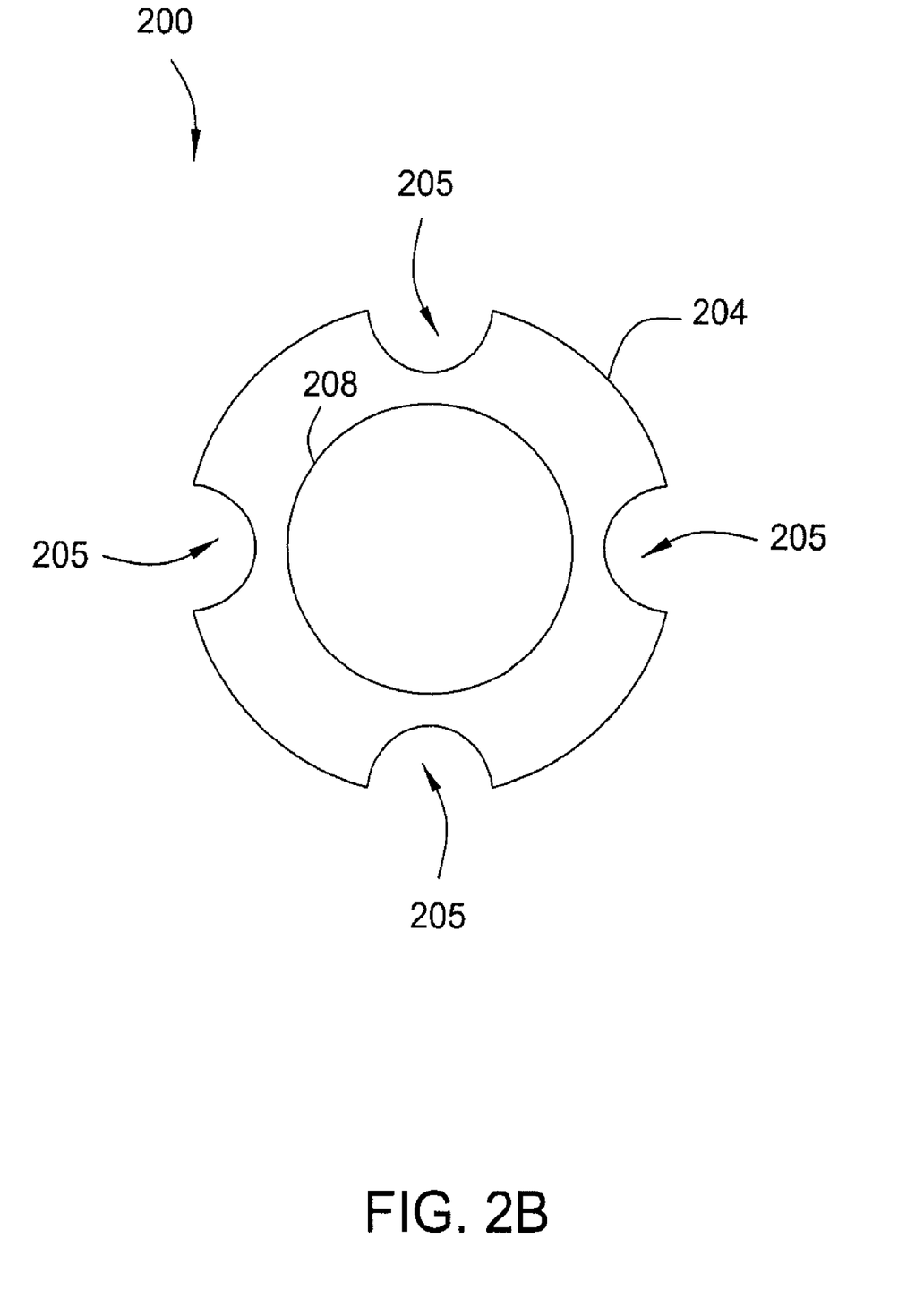
FIG. 2B is a rear view of the tool shown in FIG. 2A.

FIG. 2B is a rear view of the tool 200 shown in FIG. 2. The notches 205 provided around the abuttal flange 204 correspond to the positions of the fastening mechanisms used for securing the retainer cap on the housing. In one embodiment, the fastening mechanisms may comprise screws. As shown, the notches 205 are configured to entirely expose the head of the screws for engagement of a screwdriver (not shown) through the abuttal flange 204. The number and size of the notches 205 may vary according to the number and size of the screws used for securing the retainer cap. In the illustrated example, four notches 205 are provided equally spaced around the peripheral edge of the abuttal flange 204 to expose the screw heads. Further, the notches 205 may have a curved profile to accommodate No. 4 screw heads. In other embodiments (not shown), three notches may be provided equally spaced at about 120 degrees around the flange to accommodate three screws. While notches have been described in the foregoing embodiment, alternate embodiments may provide other structures suitable to expose the fastening mechanisms, such as slots, openings, holes, recesses, and the like.

Figure 3A:
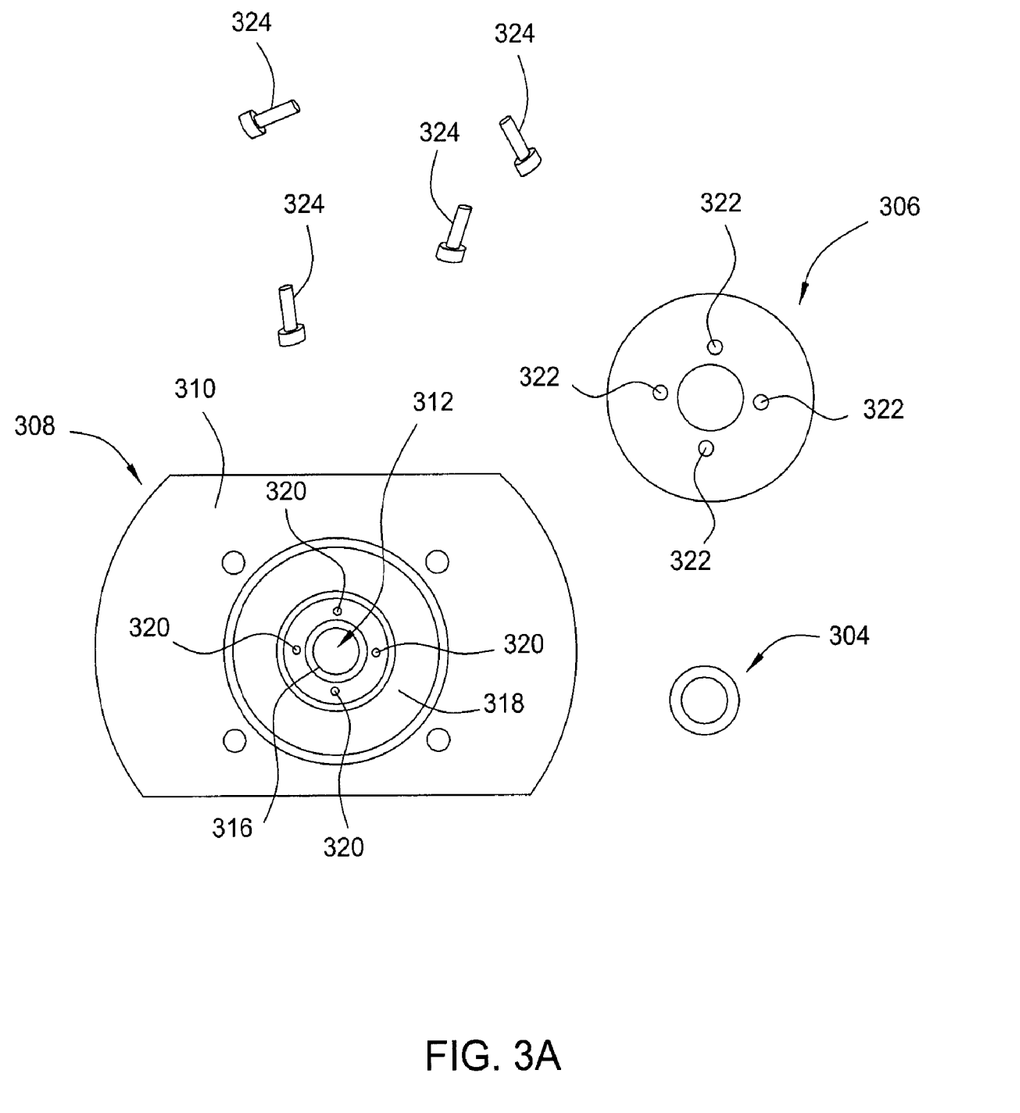
FIGS. 3A through 3E are schematic views illustrating one embodiment of using the tool to assemble a seal ring and a retainer cap on a housing.

In conjunction with FIGS. 2A and 2B, FIGS. 3A through 3E are schematic views illustrating intermediate stages of one method embodiment for using a tool 300 to assemble a seal ring 304 and a retainer cap 306 on a housing 308. FIG. 3A schematically shows the seal ring 304, retainer cap 306 and the housing 308 before they are assembled. The housing 308 has a housing body 310 through which a shaft hole 312 is provided for mounting a shaft (not shown). A side of the housing body 310 where the seal ring 304 is to be mounted includes a first surface 316 for receiving the placement of the seal ring 304 coaxial to the shaft hole 312, and a second surface 318 concentrically surrounding the first surface 316 for receiving the placement of the retainer cap 306. The first surface 316 may be recessed from the second surface 318 to form a slot for receiving the seal ring 304. The second surface 318 includes a plurality of threaded holes 320 corresponding to threaded holes 322 provided on the retainer cap 306 through which screws 324 engage to attach the retainer cap 306 on the housing body 310.

Figure 3B:
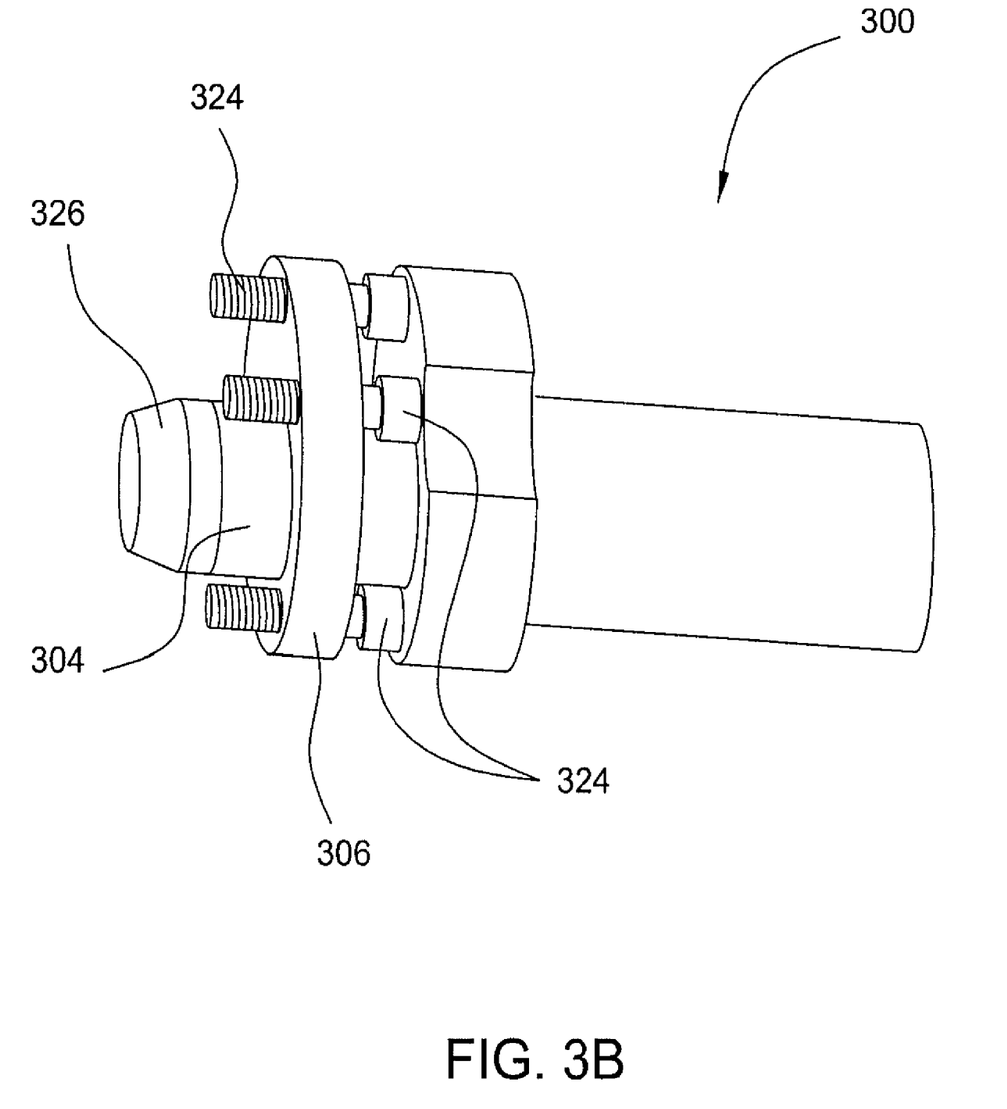

FIG. 3B illustrates an intermediate stage in which the seal ring 304 and retainer cap 306 are placed on the tool 300. The retainer cap 306 with the screws 324 engaged thereon is slid over the front portion 326 of the tool 300. The seal ring 304 is then mounted over the front portion 326 in front of the retainer cap 306. The seal ring 304 may be placed closely adjacent to the retainer cap 306.

Figure 3C:
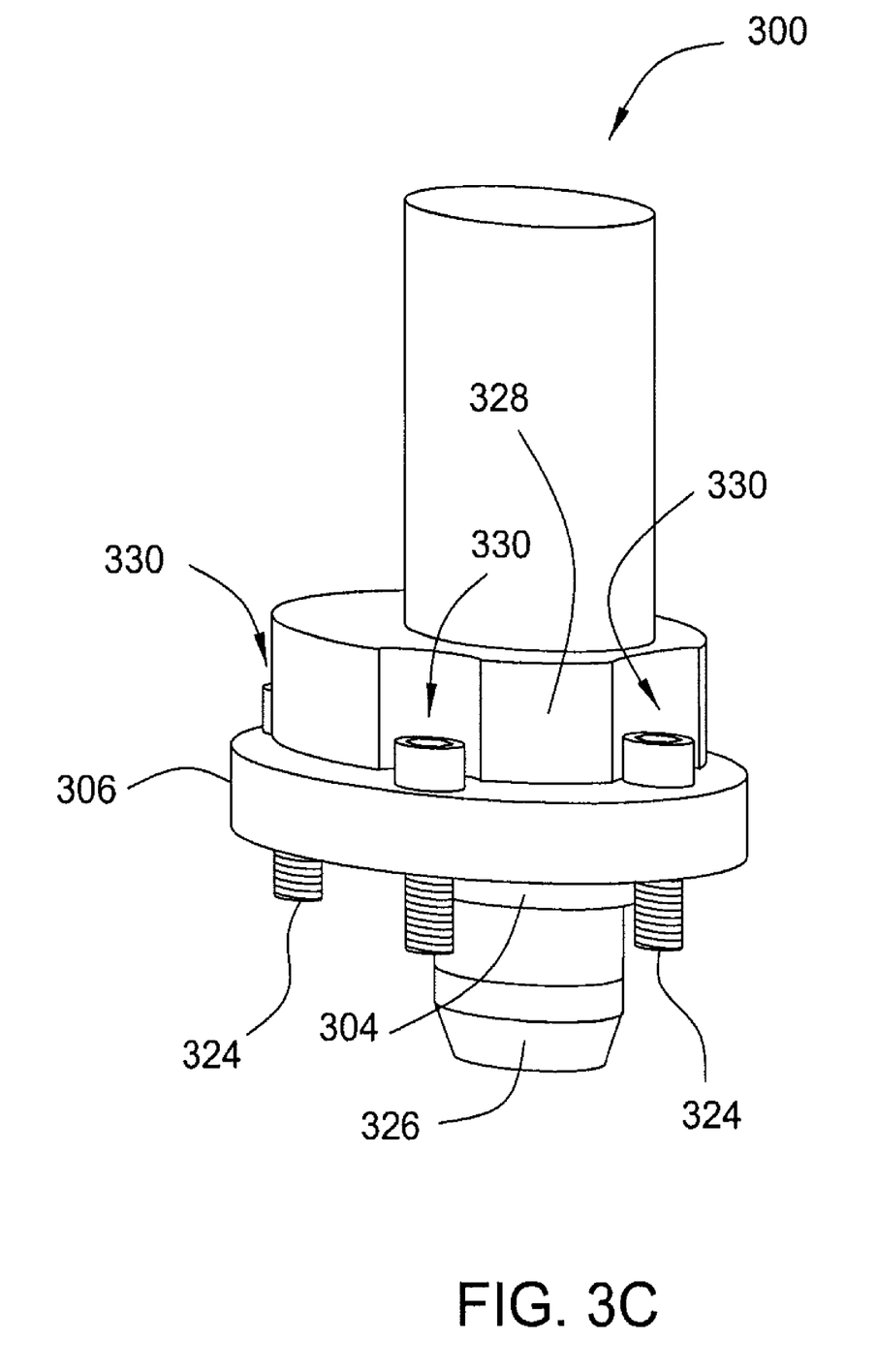

FIG. 3C illustrates a next intermediate stage in which the retainer cap 306 and the seal ring 304 are aligned on the tool 300. The retainer cap 306 is positioned on the front portion 326 abutting against the flange 328 with the screws 324 respectively aligned with and received in the notches 330. After the seal ring 304 and retainer cap 306 are disposed in the aligned position, a portion of the front portion 326 extends in front of the seal ring 304 for engaging through the shaft hole of the housing body.

It is worth noting that while the illustrated embodiment describes a retainer cap that has screws thereon when it is mounted on the tool, alternate embodiments may mount the retainer cap without screws on the tool. The screws may be engaged only once the retainer cap and the seal ring are disposed on the housing to secure the retainer cap to the housing.

Figure 3D:
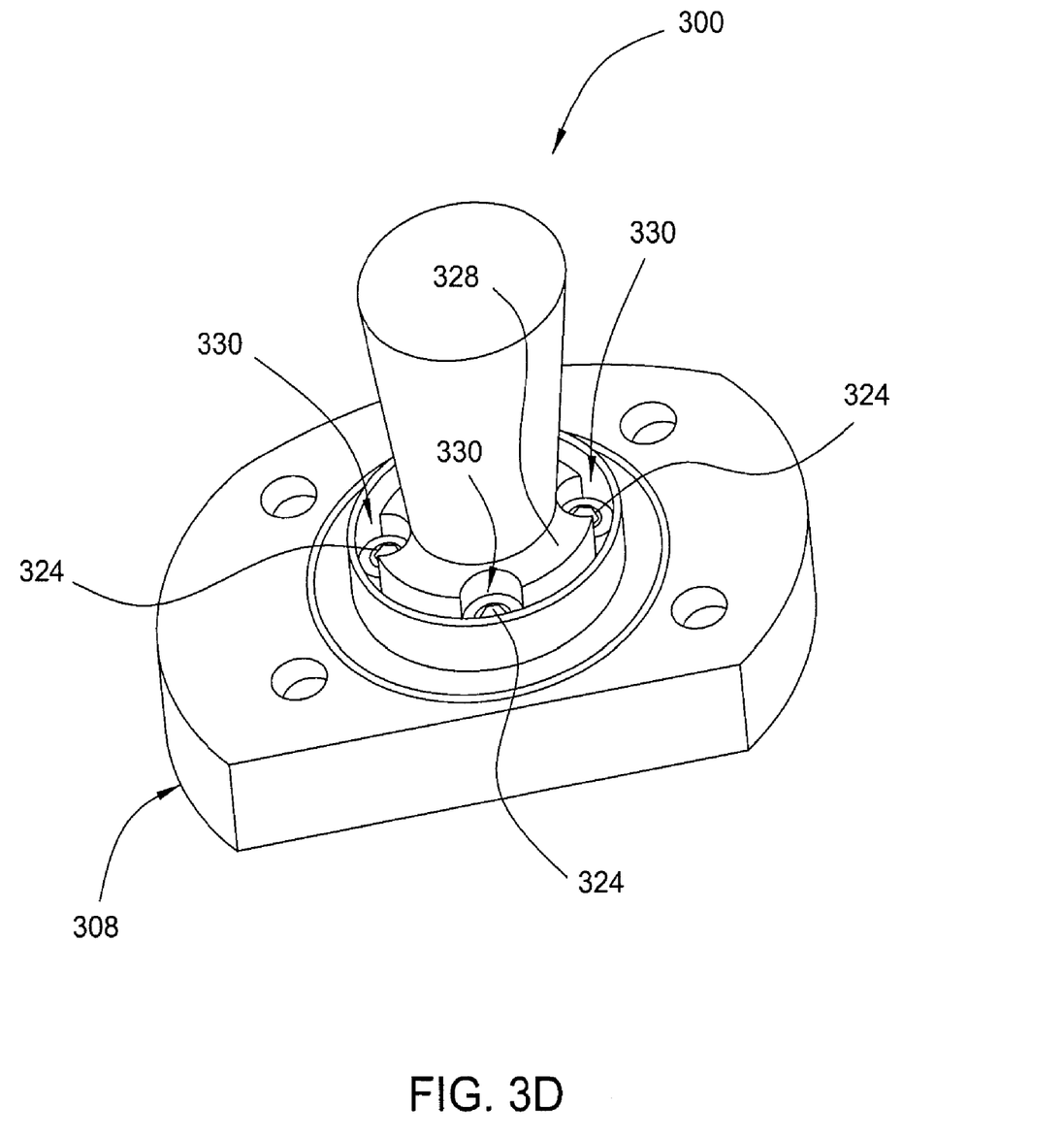

FIG. 3D illustrates the use of the tool 300 to place the seal ring 304 and the retainer cap 306 on the housing 308. After the retainer cap 306 and the seal ring 304 have been put in place on the tool 300, the operator inserts the front portion 326 of the tool 300 through the shaft hole 312 to clamp the seal ring 304 and the retainer cap 306 between the housing 308 and the abuttal flange 328. In this clamped position, the seal ring 304 abuts against the slotted first surface 316 of the housing 308 in a position coaxial to the shaft hole 312, whereas the retainer cap 306 pressed by the abuttal flange 328 abuts against the second surface 318. In one embodiment, the slotted first surface 316 may be dimensioned so that the seal ring 304 press fits therein in the clamped position. While the seal ring 304 and retainer cap 306 are maintained in the clamped position, the screws 324 then are tightened into the threaded holes 320 of the housing 308 by using a screwdriver (not shown) operated through the notches 330 of the abuttal flange 328. The seal ring 304 and retainer cap 306 are thereby fixedly secured on the housing 308.

Figure 3E:
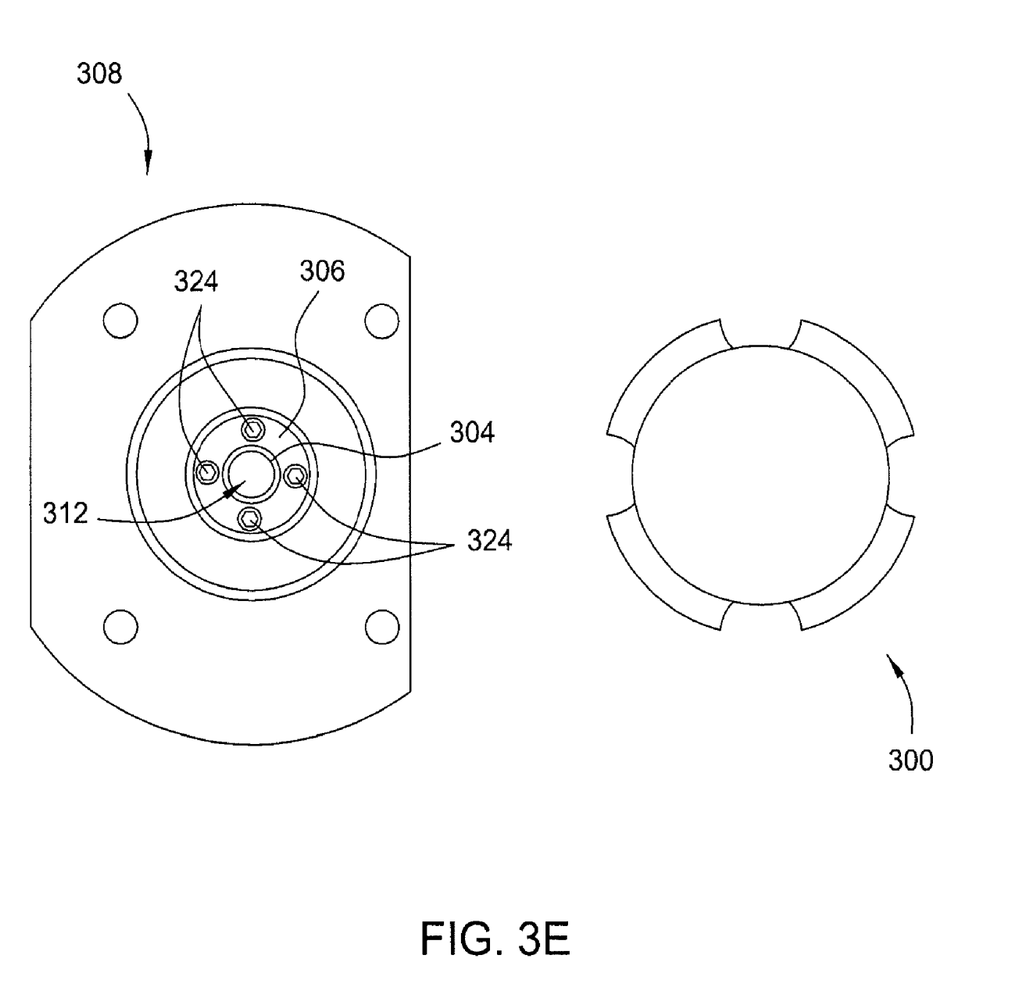

FIG. 3E illustrates the housing 308 after the seal ring 304 and retainer cap 306 are installed thereon. Once the seal ring 304 and the retainer cap 306 are securely attached on the housing 308, the tool 300 can be removed from the shaft hole 312 and the respective openings of the seal ring 304 and retainer cap 306. The seal ring assembly comprising the housing 308 and the seal ring 304 and retainer cap 306 attached thereon is thereby completed.

The tool described herein thus enables an operator to assemble with ease the seal ring and the retainer cap on the housing in a correct manner. As the tool is removed only after the seal ring and the retainer cap are positioned and securely fixed on the housing, no misalignment occurs. As a result, damages and replacements of the seal ring owing to incorrect assembly operations thus can be prevented.

While the foregoing is directed to embodiments of the present invention, other and further embodiments of the invention may be devised without departing from the basic scope thereof, and the scope thereof is determined by the claims that follow.

I claim:

1. A seal installation tool for disposing a seal ring on a housing, comprising:
    an elongated body having a first portion and a second portion, the first portion having a first length and a first diameter, the second portion having a second length and a second diameter different from the first diameter, wherein an outer surface of the first portion has a tapered end; and
    a flange projecting radially from the elongated body and separating the first portion from the second portion, the flange substantially encircling the elongated body and having one or more notches therein, wherein the elongated body is fixed relative to the flange, and wherein the elongated body and the flange are an unitary body.

2. The tool of claim 1, wherein the one or more notches comprises four notches.

3. The tool of claim 2, wherein the one or more notches are equally spaced around the perimeter of the flange.

4. The tool of claim 3, wherein at least one notch comprises a substantially curved surface.

5. The tool of claim 1, wherein the second portion has a diameter between about 0.25 inches and about 0.75 inches.

6. The tool of claim 1, wherein the first portion has diameter between about 0.25 inches and about 0.75 inches.

7. The method of claim 6, wherein the first length is between about 0.25 inches and about 0.75 inches.

8. The tool of claim 1, wherein the first diameter is less than the second diameter.

9. The tool of claim 1, wherein the elongated body and the flange comprise poly(ethylene terephthalate).

10. A seal installation tool, comprising:
    an elongated body comprising a polymer, the body having:
    a handle portion sized and shaped to be gripped by a technician;
    a fastening mechanism housing coupled to the handle portion and extending radially outward from the handle portion; and
    a seal receiving portion having a diameter less than a diameter of the handle portion, the seal receiving portion having a first surface substantially parallel to a surface of the handle portion, a second surface perpendicular to a surface of the handle portion, and a third surface disposed at an angle relative to both the first and second surfaces, wherein the third surface is a tapered end formed on an outer surface of the seal receiving portion, wherein the fastening mechanism housing is fixed relative to the handle portion, the seal receiving portion and the handle portion, and wherein the fastening mechanism housing and the seal receiving portion are an unitary body.

11. A seal installation method, comprising:
    disposing a retainer cap onto a first portion of a tool, the tool comprising an elongated body having the first portion and a second portion, the first portion having a first length and a first diameter, the second portion having a second length and a second diameter different from the first diameter, wherein an outer surface of the first portion has a tapered end and a flange projecting radially from the elongated body and separating the first portion from the second portion, the flange substantially encircling the elongated body and having one or more notches therein, wherein the elongated body is fixed relative to the flange, and wherein the elongated body and the flange are an unitary body;
    disposing the seal on the tool in front of the retainer cap by sliding the seal over the portion of the elongated body;
    passing the first portion of the elongated body through a hole of a housing to clamp the seal between the retainer cap and the housing; and
    engaging one or more screws through the retainer cap to the housing to securely fix the seal and the retainer cap on the housing.

12. The method of claim 11, wherein the one or more screws as disposed through the retainer cap prior to disposing the retainer cap onto the first portion.

13. The method of claim 12, wherein the flange comprises one or more notches sized to receive one screw of the one or more screws.

14. The method of claim 13, wherein the one or more notches comprises four notches and the one or more screws comprises four screws.

15. The method of claim 11, further comprising removing the tool after engaging the one or more screws to the housing.

16. The method of claim 11, wherein the elongated body and the flange comprise a unitary piece.

17. The method of claim 16, wherein the elongated body and the flange comprise poly (ethylene terephthalate).

18. The method of claim 11, wherein the first diameter is less than the second diameter, and wherein the first diameter is substantially equal to the diameter of the seal.

* * * * *